United States Patent [19]
Andler et al.

[11] 3,802,052
[45] Apr. 9, 1974

[54] DETECTING MECHANISM FOR DETECTING A MISSING END CAP OF A FILM

[75] Inventors: Richard C. Andler; Richard I. Kinsella, both of Rochester, N.Y.

[73] Assignee: Eastman Kodak Company, Rochester, N.Y.

[22] Filed: Jan. 12, 1973

[21] Appl. No.: 323,174

[52] U.S. Cl............ 29/208 C, 29/208 D, 29/208 E, 53/67
[51] Int. Cl............................................ B23p 19/04
[58] Field of Search .......... 29/208 C, 208 D, 208 E, 29/200 B; 53/64, 67, 118; 83/64; 113/80 C

[56] References Cited
UNITED STATES PATENTS

| 1,767,818 | 6/1930 | Smulski | 53/303 X |
| 2,198,225 | 4/1940 | Newey | 53/64 |
| 2,616,541 | 11/1952 | Smith | 53/64 |
| 2,915,029 | 12/1959 | Hohl et al. | 113/80 C |
| 3,092,941 | 6/1963 | Baker | 83/64 |
| 3,226,816 | 1/1966 | Wilson et al. | 29/200 B X |
| 3,364,551 | 1/1968 | Napor et al. | 29/208 D |
| 3,364,552 | 1/1968 | Napor et al. | 29/208 D |
| 3,452,651 | 7/1969 | Vadas et al. | 53/67 X |
| 3,457,627 | 7/1969 | Napor et al. | 29/208 D |

Primary Examiner—Thomas H. Eager
Attorney, Agent, or Firm—Steve W. Gremban

[57] ABSTRACT

A detecting mechanism in a film magazine spooling machine for detecting a missing end cap of a film magazine. The detecting mechanism comprises a pusher element movable a predetermined distance into engagement with one end of the magazine film spool and to apply pressure thereto. If the end cap is properly staked on the magazine, the film spool and pusher element is stopped thereby without interferring with the normal sequence of machine functions. However, if an end cap is missing from or improperly staked on the magazine, the pusher element is movable past the predetermined distance ejecting the film spool and improperly staked end cap from the magazine and causing a sensing mechanism responsive to movement of the pusher element to inhibit certain machine functions, and to actuate a diverting mechanism for diverting the defective magazine, and an annunciator to alert the operator.

8 Claims, 5 Drawing Figures

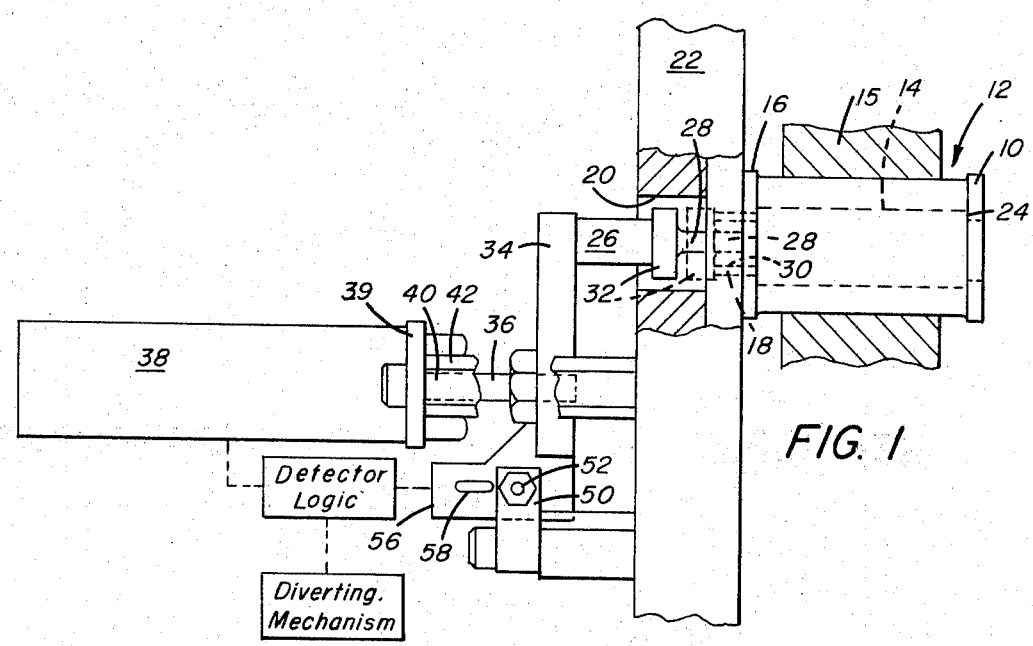
FIG. 1
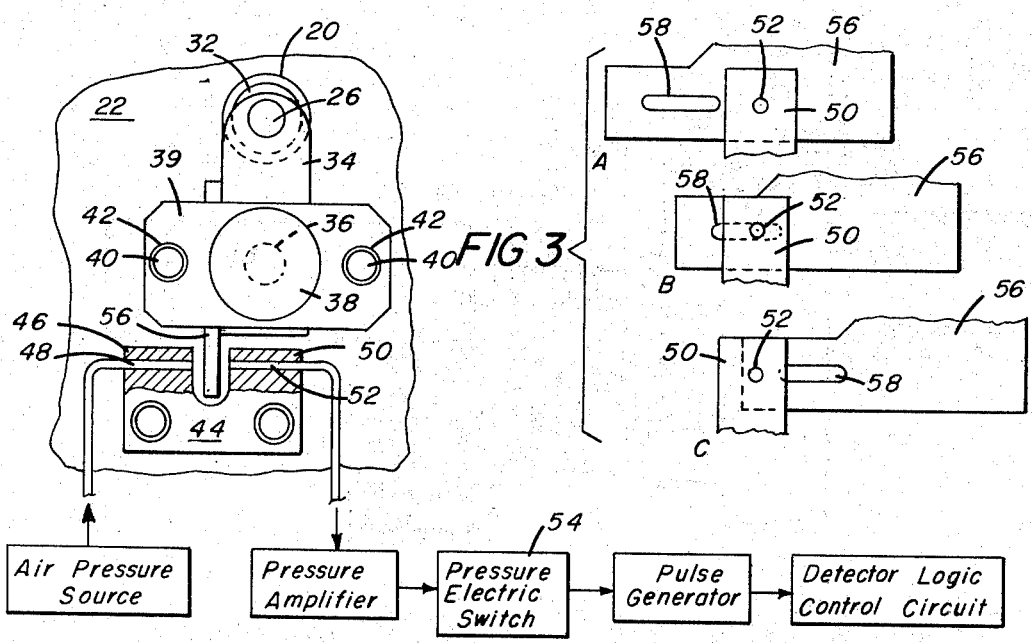
FIG. 2
FIG. 3

DETECTING MECHANISM FOR DETECTING A MISSING END CAP OF A FILM

BACKGROUND OF THE INVENTION

1. Field of the Invention

This invention relates generally to detectors, and more specifically to a detecting mechanism for a magazine spooling machine for detecting a missing end cap of a film magazine.

2. Description of the Prior Art

It is known in the photographic industry to provide cylindrical film cans or magazines having a first light-tight cap at one end and a light-tight magazine mouth formed by axially extending, peripheral spaced-apart lips to which plush material is secured in facing relation. In the manufacture of film magazines under darkroom conditions, a spool having a roll of unexposed light-sensitive film wound thereon is fed into the outer free end of each magazine with a leading end portion thereof extending through the light-tight mouth of the magazine. The magazine containing the film is positioned in a forming or capping jaw which compresses the outer free end of the magazine to the precise shape for receiving a second end cap. The second end cap is fed from an end cap source to a position in alignment with the magazine, and the second end cap advanced by a staking mechanism onto or over the free end of the magazine. A portion of the staking mechanism is expanded, crimping the rim of the second end cap to the end of the magazine to form a completed light-tight film magazine. Problems have arisen in situations in which the first end cap is missing from the magazine, or improperly staked, resulting in a defective film magazine.

SUMMARY OF THE INVENTION

This invention includes within its scope a detecting mechanism for detecting a missing or improperly staked end cap of a film magazine, and in response thereto inhibiting certain machine functions and actuating a diverting mechanism for diverting the defective magazine. In a preferred embodiment of the detecting mechanism, a pusher element is movable a predetermined distance into engagement with one end of the magazine film spool and applies pressure thereto. If the end cap on the opposite end of the magazine is not missing and properly staked, the spool engages the end cap and the pusher element cannot move any further. Accordingly, the normal sequence of machine functions continues. However, if the end cap on the opposite end of the magazine is missing or improperly staked, the pusher element is moved past the predetermined distance ejecting the film spool from the magazine and causing a sensing mechanism responsive to movement of the pusher element to, among other things, inhibit certain machine functions, and actuate a diverting mechanism for diverting the defective film magazine, when released, and an annunciator or the like for alerting the operator.

Accordingly, one of the objects of the present invention is to provide a detecting mechanism for detecting a properly staked end cap on a film magazine.

Another object of the invention is to provide a detecting mechanism for detecting a missing or improperly staked end cap on a film magazine, and in response thereto, inhibiting certain machine functions, ejecting the film spool from the magazine, and/or actuating a diverting mechanism for diverting the defective film magazine, when released.

Another object of the invention is to provide an improved detecting device for film magazines that eliminates the production of defective film magazines having a missing or improperly staked end cap.

Another object of the invention is to provide a missing improperly staked end cap detecting mechanism that is of simple design and construction, thoroughly reliable and efficient in operation, and economical to manufacture.

The invention and its objects and advantages will become more apprent from the detailed description of the preferred embodiment presented below.

BRIEF DESCRIPTION OF THE DRAWINGS

FIG. 1 is a top plan view, partially in section and block diagram form, of a preferred embodiment of the detecting mechanism of this invention;

FIG. 2 is a side elevational view of the detecting mechanism of FIG. 1;

FIG. 3 is a top plan view of the sensor of FIG. 1 illustrating three different positions of the interrupter plate;

DESCRIPTION OF THE PREFERRED EMBODIMENT

Figure 4:
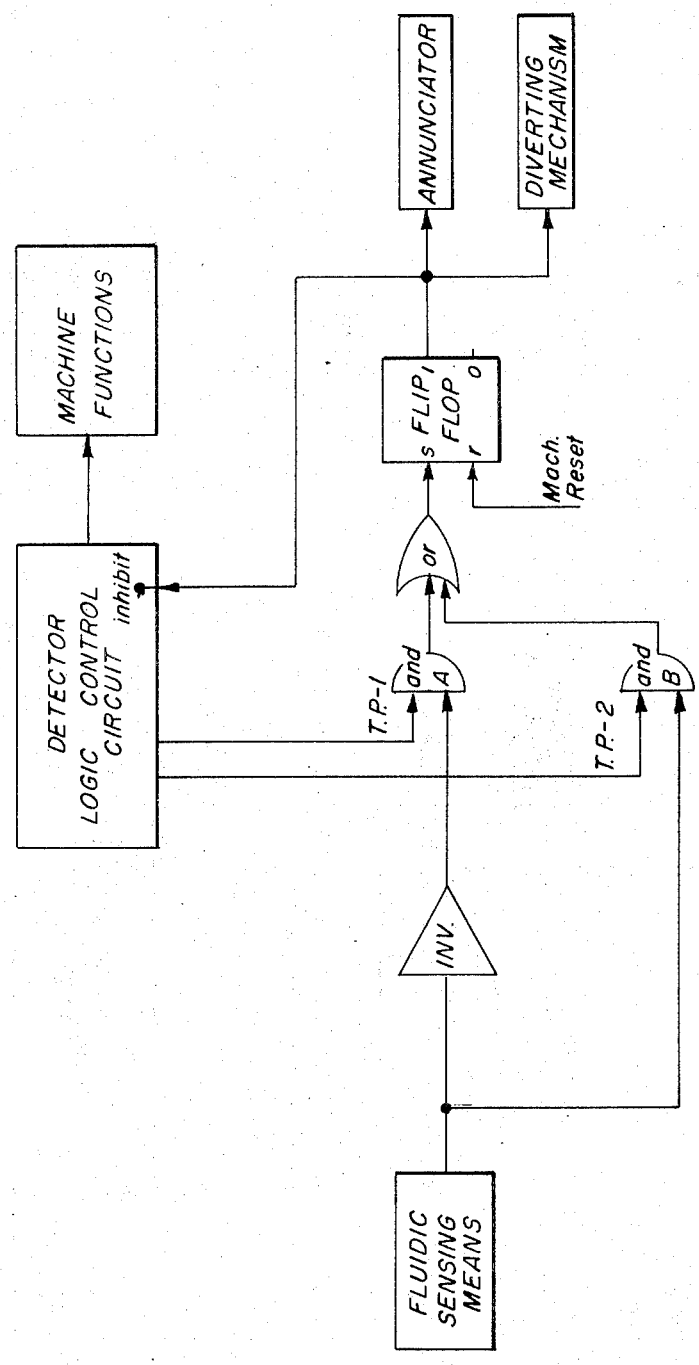
FIG. 4 is a schematic circuit diagram of the detecting mechanism of this invention.

Because detecting mechanisms are well known, the present description will be directed in particular to elements forming part of, or cooperating more directly with, apparatus in accordance with the present invention. Detector elements and logic components not specifically shown or described herein should be understood to be selectable from those known in the art.

With reference to the drawings, a preferred embodiment of a detecting mechanism is illustrated for detecting a missing or improperly staked end cap 10 on a film magazine 12. The detecting mechanism is normally a part of a film spooling machine in which a spool 14 having film wound thereon is initially inserted through the open end of a film case having end cap 10 staked at one end, and then another end cap 16 staked on the open end to complete the film magazine 12. The spooling machine is of a type generally known in the art, comprising movable jaws 15, shown in segmental form in section, for releasably holding magazine 12 at appropriate operating stations, such as an end cap detecting station, for detecting a missing or improperly staked end cap 10. The magazines are successively held at the end cap detecting station, as best seen in FIG. 1, with a projecting end 18 of film spool 14 in register with an opening 20 in a frame 22 of the spooling machine. In such position, end cap 10 is on the end of the magazine opposite spool end 18, and end cap 16 is on the same end of the magazine as spool end 18. The spool 14 is rotatably supported by end caps 10, 16 and a shoulder 24 on the spool substantially bears against end cap 10.

The detecting mechanism of this invention comprises an elongated pusher element 26 having a tip 28 in alignment with a bore 30 in spool end 18, and a flange 32 engageable with the outer surface of spool end 18. The pusher element 26 is secured to a drive plate 34, which is secured, by any suitable means, to a reciprocally movable rod 36 of a fluid cylinder 38 of known type. Cylinder 38 has a flange 39 which is secured to frame 22 by a pair of bolts 40 and spacers 42.

The sensing means for the detecting mechanism as best illustrated in FIG. 2 comprises a U-shaped sensing head 44 in which one leg 46 thereof defines a port 48 connected to any suitable air pressure source, and the other leg 50 has a port 52 in register therewith connected to any suitable commercially available pressure amplifier, such as a Schmitt trigger. The output of the trigger controls a pressure actuated electrical switch 54 coupled to any suitable pulse generating circuit for generating an electrical pulse (F.S.M.) fed to a detector logic control circuit. An interrupter plate 56 is secured by screws or the like to drive plate 34 for slidable movement between ports 48, 52, and has an elongated slot 58 which is movable into and out of register with ports 48, 52 as best illustrated in FIG. 3. Normally, when the ports 48, 52 are interrupted as illustrated in FIGS. 3 A and C, the switch 54 is in an open position, and when the ports 48, 52 are uncovered, as illustrated in FIG. 3 B, the switch 54 is closed. This latter action occurs when pusher element 26 is moved a predetermined distance to a sensing position as shown dotted in FIG. 1, and an end cap 10 is present and prevents further movement of the pusher element. In each cycle of operation, pusher element 26 is moved from its normal retracted position as seen in full lines in FIG. 1 an FIG. 3 A to its sensing position shown dotted in FIG. 1 and in FIG. 3 B or to its ejecting position shown in FIG. 3 C, and then returned to its normal retracted position. Such action actuates the pulse generating circuit for generating an F.S.M. pulse "P" (FIG. 5) of short duration when moved to the FIG. 3 C position, and a pulse "P" of longer duration when moved to the FIG. 3 B position. The generated pulses are applied to the detector logic control circuit now to be explained.

Figure 5:
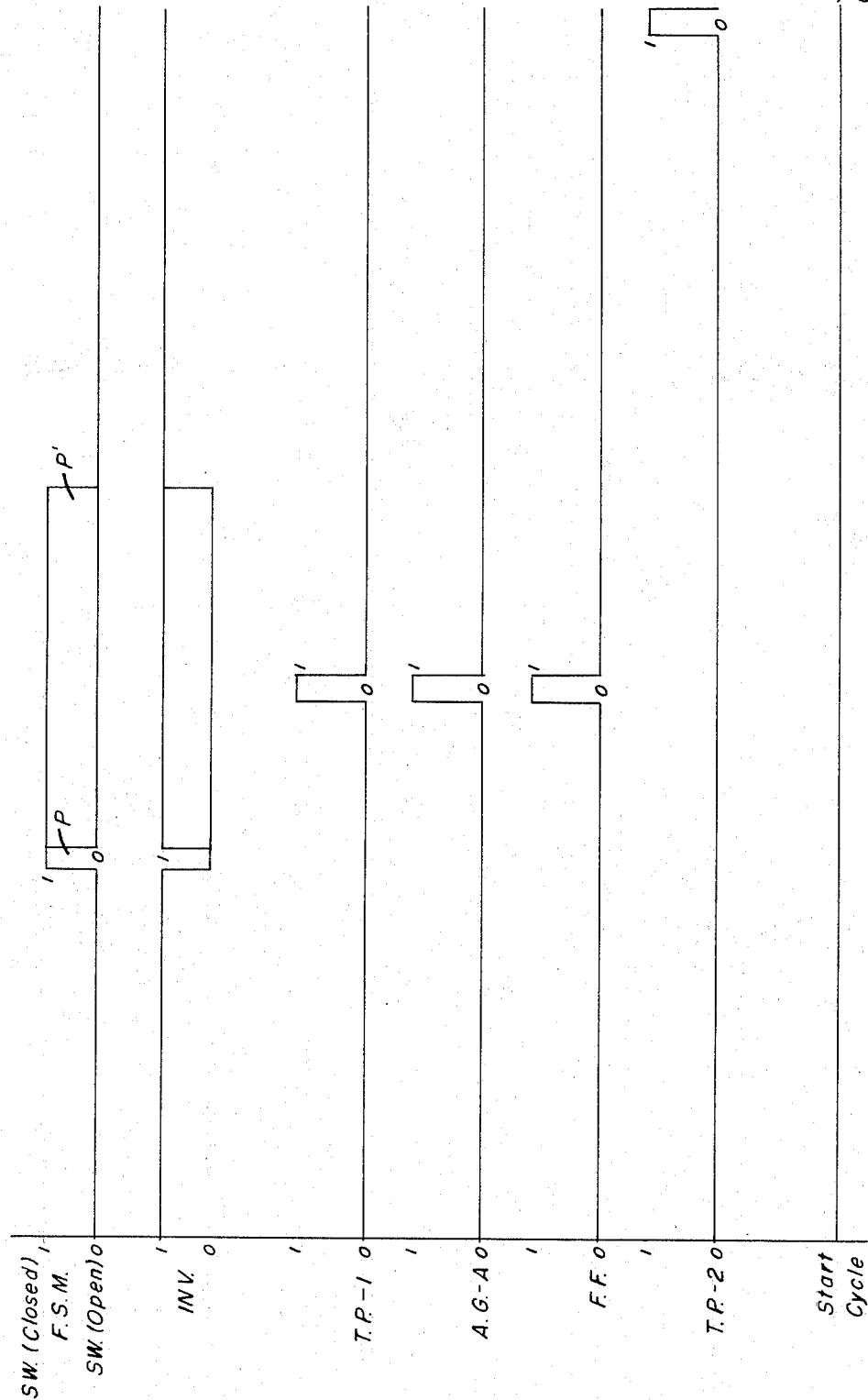
FIG. 5 is a graph illustrating a cycle of operation and the pulses generated by various components of the circuit diagram of FIG. 4.

The detector logic control circuit for interconnecting among other things, the sensing means to a defective magazine diverting means of any suitable type for diverting defective magazines from a normal path followed by good magazines is best illustrated in FIG. 4. The diverting means may comprise a pivotally movable deflecting panel, a solenoid valve operated air jet, or pusher element 26 itself. The interrelationship between the F.S.M. signal generated by the sensing means and the signal generated by various components of the detector logic control circuit is illustrated in FIG. 5. The detector logic control circuit comprises an inverter (I.N.V.) for receiving the F.S.M. signal instigated by the electrical switch 54 of the sensing means, inverting the signal and applying it to an AND gate A (A.G.A.). When interrupter plate 56 of the sensing means is in its normal retracted position (FIG. 3 A), switch 54 is in its normal open position and the F.S.M. signal supplied to the inverter is designated logic "0." When interrupter plate 56 is moved to its sensing position and senses a properly staked end cap 10 (FIG. 3 B), switch 54 is closed and the F.S.M. signal applied to the inverter is designated logic "1." Accordingly, when a properly staked end cap 10 is sensed, a signal 1 designated P' is applied to the inverter and an output signal "0" applied to AND gate A. This generates an output "0" from AND gate A, which is fed to an OR gate, in turn feeding an "0" signal to a flip-flop (F.F.) circuit. Since the flip-flop had been previously reset, the output from the flip-flop is "0," which is, among other things, to the defective magazine diverting mechanism, which remains in its normal inactive state. Accordingly, all of the machine functions continue. However, if the sensing means does not sense a properly staked end cap 10 when pusher element 26 is moved from and to its normal retracted position, overtravel of pusher element 26 and interrupter plate 56 to an ejecting position occurs as illustrated in FIG. 3 C. Switch 54 momentarily closes and opens generating a short pulse P followed by an F.S.M. "0" signal supplied to the inverter. An output signal "1" from the inverter is applied along with a timing pulse T.P.-1 from the logic control circuit, to AND gate A. The output "1" of AND gate A is applied to the OR gate, and the output "1" of the OR gate applied to the flip-flop. Since the flip-flop had been previously reset, the signal "1" sets the flip-flop, causing an output "1" to be applied to the detector logic control inhibit terminal, annunciator, and defective magazine diverting mechanism. Accordingly, the logic control inhibits certain machine functions an annunciator is actuated to alert the operator, and the defective magazine diverting mechanism is actuated for diverting the defective film magazine, when released. Also, movement of pusher element 26 to the ejecting position causes the element to strike film spool end 18 and eject spool 14 from magazine 12. If for some reason switch 54 should remain closed after the sensing means is returned to its normal retracted position, an interrogation pulse T.P.-2 is fed into AND gate B at the end of the cycle along with the signal "1" from the closed switch. This causes a signal "1" to be applied to the OR gate and output "1" from the OR gate to be applied to the flip-flop. The flip-flop has an output "1" which is applied to the machine function logic control inhibit terminal, annunciator, and defective magazine diverting mechanism to inhibit the staking and other machine operations to permit correction of the malfunctioning switch 54.

The invention has been described in detail with particular reference to a preferred embodiment thereof, but it will be understood that variations and modifications can be effected within the spirit and scope of the invention as described hereinabove.

We claim:

1. In a detecting mechanism for detecting a missing or improperly staked end cap on a film magazine substantially of the type having a film spool, an outer cylindrical case encircling the film spool, and end caps for closing off the open ends of the case and for rotatably supporting the spool, the combination comprising:

means for releasably holding a film magazine having a film spool in an operating position with an end cap at one end of said spool;

pusher means in alignment with said film spool at said operating position, and movable from a normal retracted position to a sensing position into pressure engagement with the other end of said film spool, where it is prevented from further movement if said end cap is properly staked on the magazine or to a film spool ejecting position past said sensing position, if said end cap is missing or improperly staked and is unable to withstand the pressure of said pusher means;

diverting means adapted when operated to divert magazines having a missing end cap along a defective magazine path when released by said holding means; and detecting means coupled to said pusher means for detecting said sensing and ejecting positions of said pusher means and for operating said diverting means when said pusher means is moved to said ejecting position.

2. The invention according to claim 1 wherein said pusher means comprises a rod-like element reciprocally movable by an air cylinder.

3. The invention according to claim 1 wherein said detecting means comprises a fluid jet, and means for interrupting said jet.

4. The invention according to claim 1 wherein said detecting means comprises a fluid jet, and a plate connected to said pusher means for movement therewith for interrupting said jet.

5. The invention according to claim 4 wherein said plate is coupled to said pusher means for movement therewith and is provided with a slot movable into register with said jet in said sensing position of said pusher means, but movable out of register with said jet for interrupting said in said ejecting position of said pusher means.

6. The invention according to claim 1 wherein said detecting means comprises a sensing means, and a logic control circuit responsive to the output of said sensing means.

7. The invention according to claim 1 wherein said detecting means comprises a fluidic sensing means for generating a predetermined signal when said pusher means is moved to said sensing position, and a different signal when said pusher means is moved to said ejecting position, and a logic control circuit responsive only to said different signal for operating said diverting means.

8. The invention according to claim 1 wherein said pusher means when moved to said ejecting position strikes and ejects said film spool from said magazine.

* * * * *